Figure 10:
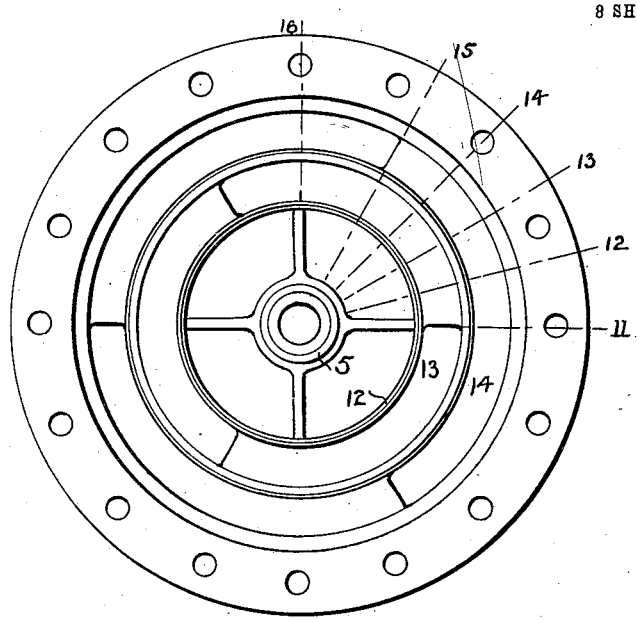
Figure 11:
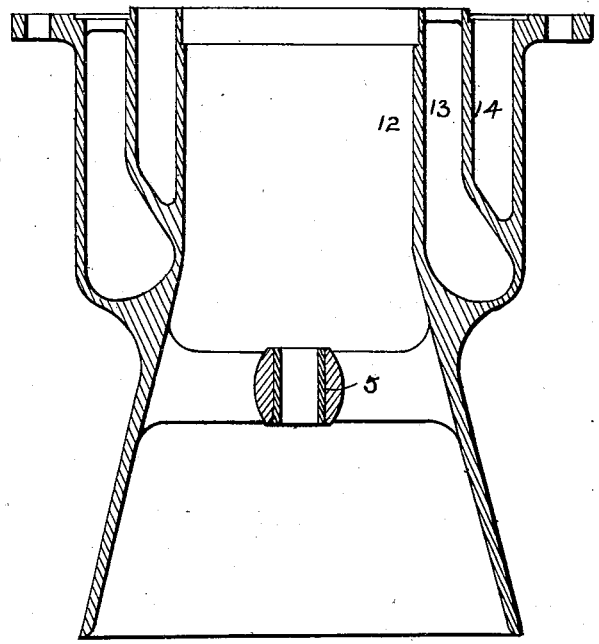
Figure 12:
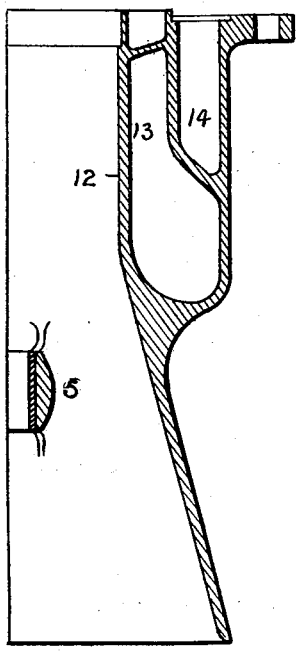
Figure 13:
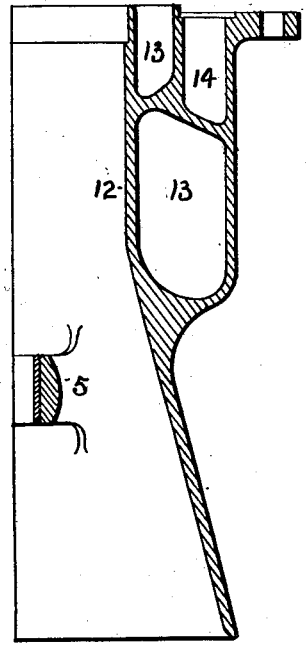
Figure 14:
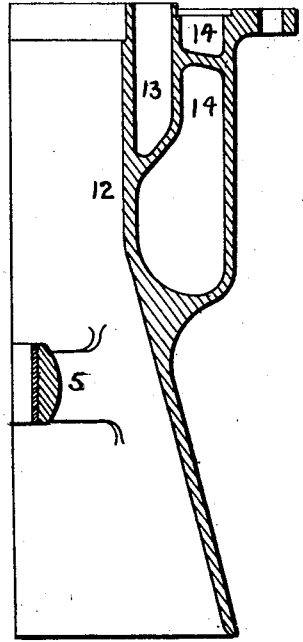
Figure 15:
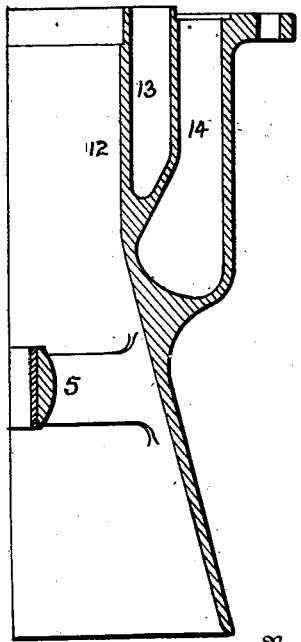
Figure 16:
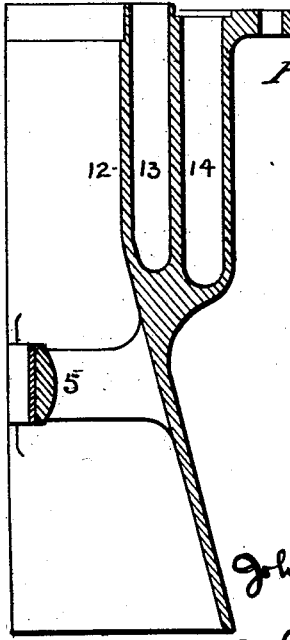

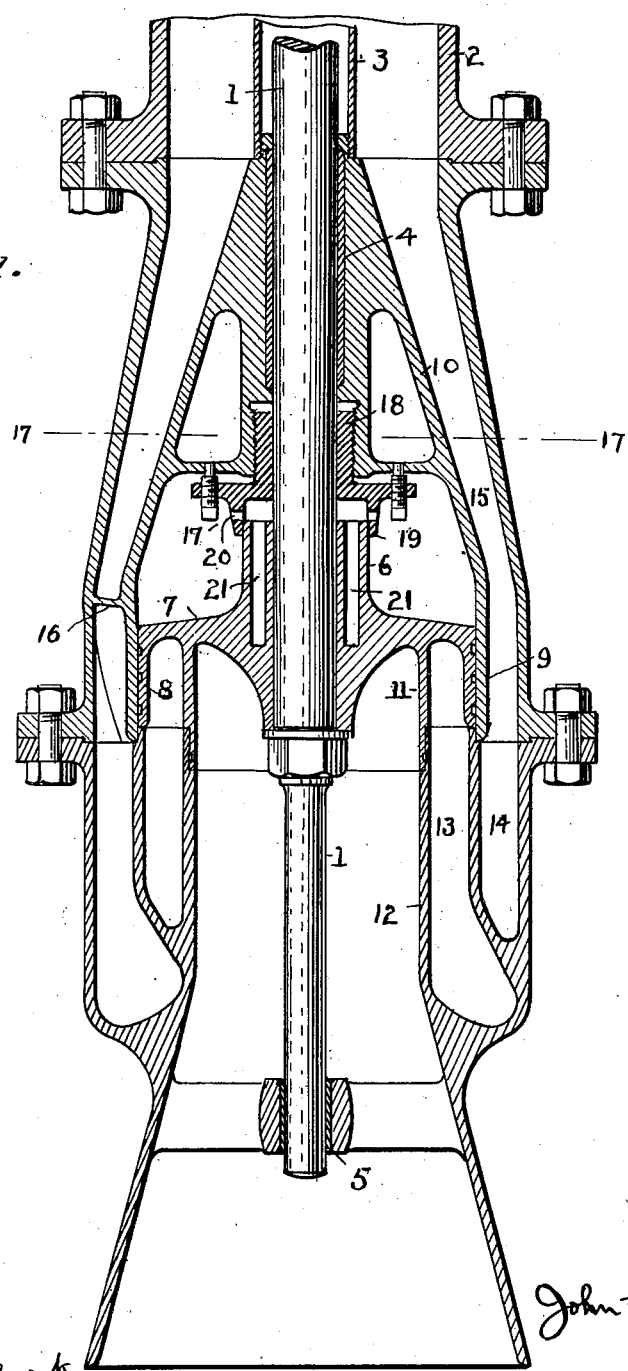

No. 735,692. PATENTED AUG. 11, 1903.
J. W. ALVORD.
HIGH SPEED ROTARY PUMP.
APPLICATION FILED MAR. 30, 1903.
NO MODEL. 8 SHEETS—SHEET 2.
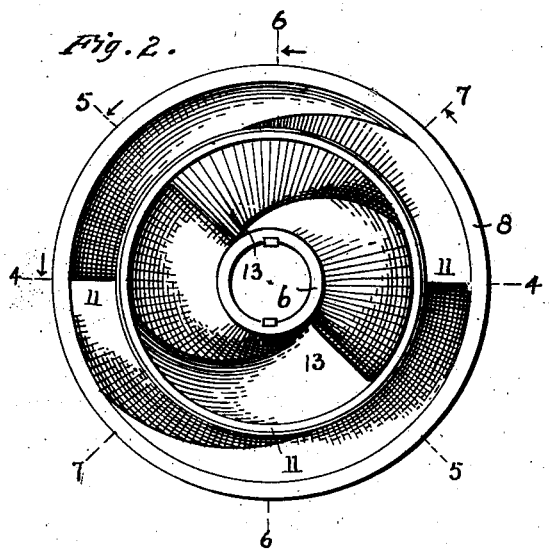
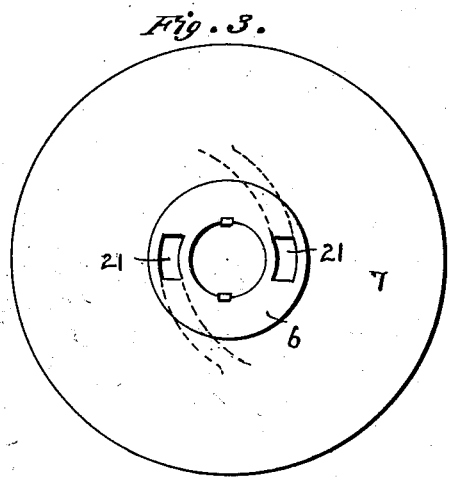
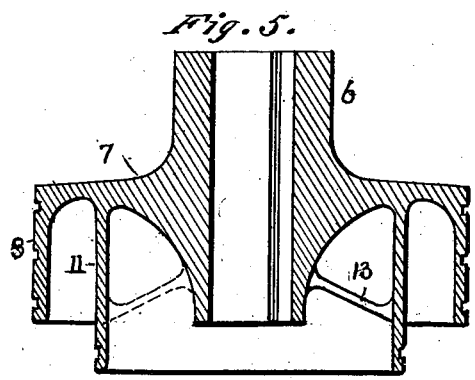
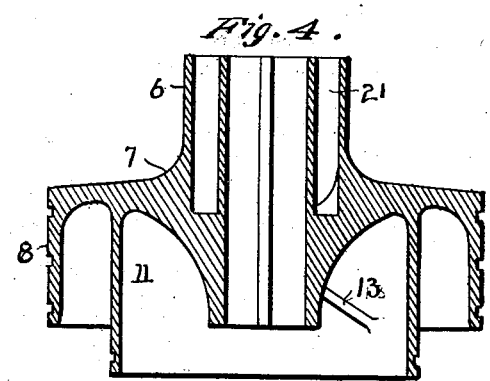
Witnesses
Inventor
John W. Alvord

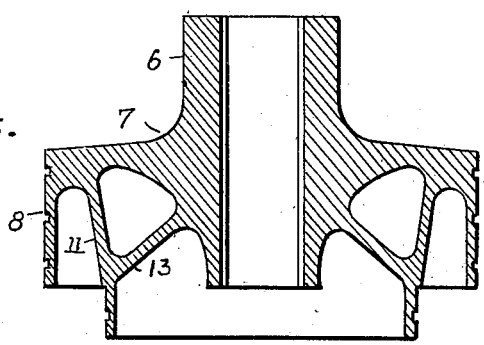
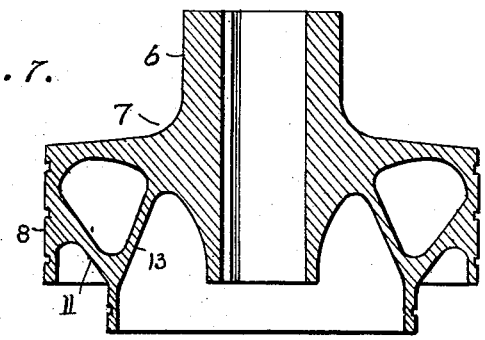
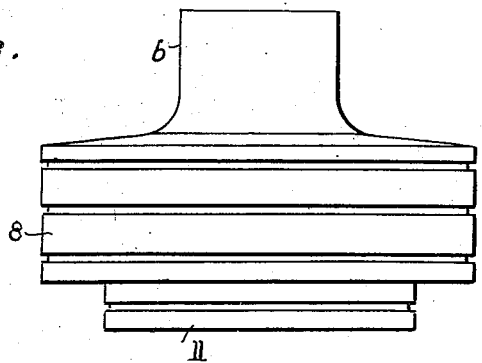

No. 735,692. PATENTED AUG. 11, 1903.
J. W. ALVORD.
HIGH SPEED ROTARY PUMP.
APPLICATION FILED MAR. 30, 1903.
NO MODEL. 8 SHEETS—SHEET 4.

Witnesses
Inventor
John W. Alvord,
By
Attorney

No. 735,692. PATENTED AUG. 11, 1903.
J. W. ALVORD.
HIGH SPEED ROTARY PUMP.
APPLICATION FILED MAR. 30, 1903.
NO MODEL. 8 SHEETS—SHEET 5.

No. 735,692. PATENTED AUG. 11, 1903.
J. W. ALVORD.
HIGH SPEED ROTARY PUMP.
APPLICATION FILED MAR. 30, 1903.
NO MODEL. 8 SHEETS—SHEET 6.
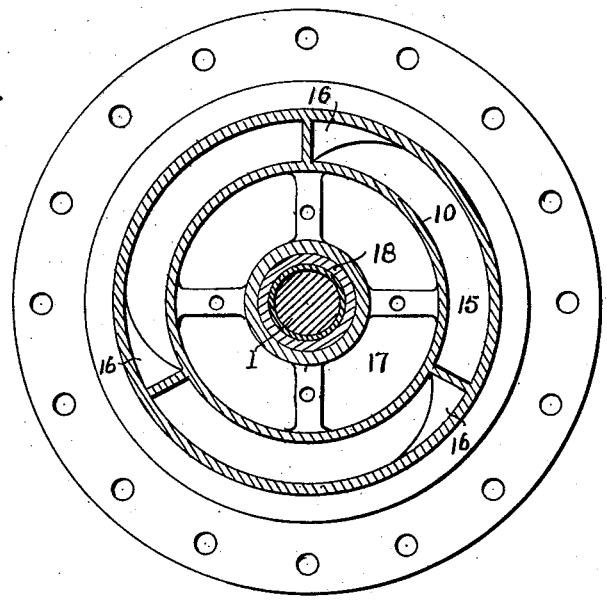
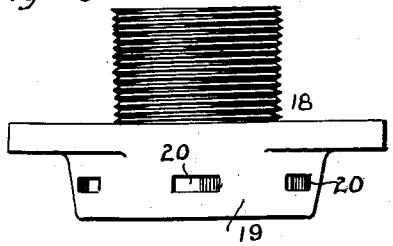
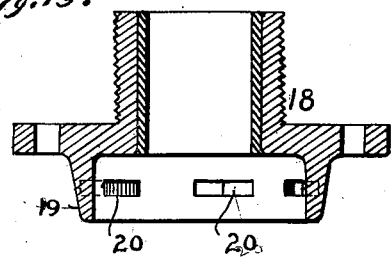
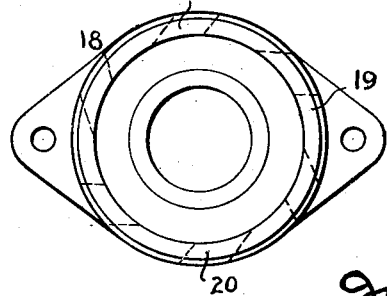

No. 735,692. PATENTED AUG. 11, 1903.
J. W. ALVORD.
HIGH SPEED ROTARY PUMP.
APPLICATION FILED MAR. 30, 1903.
NO MODEL. 8 SHEETS—SHEET 7.

Witnesses
Norris A. Clark
Richard H. Tucker

Inventor
John W. Alvord,
By
Attorney

No. 735,692. PATENTED AUG. 11, 1903.
J. W. ALVORD.
HIGH SPEED ROTARY PUMP.
APPLICATION FILED MAR. 30, 1903.
NO MODEL. 8 SHEETS—SHEET 8.

Witnesses
Norris A. Clark.
Richard H. Tucker.

Inventor
John W. Alvord
By Geo. Whitney
Attorney

No. 735,692. Patented August 11, 1903.

UNITED STATES PATENT OFFICE.

JOHN WATSON ALVORD, OF CHICAGO, ILLINOIS.

HIGH-SPEED ROTARY PUMP.

SPECIFICATION forming part of Letters Patent No. 735,692, dated August 11, 1903.

Application filed March 30, 1903. Serial No. 150,184. (No model.)

*To all whom it may concern:*

Be it known that I, JOHN WATSON ALVORD, a citizen of the United States, residing at Chicago, in the county of Cook and State of Illinois, have invented certain new and useful Improvements in High-Speed Rotary Pumps; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to high-speed rotary pumps for deep wells, by which I mean wells a hundred feet or more in depth. In such wells the rotary pump is located far below the surface of the ground, being operated by an upright shaft rising to the surface and there driven by some suitable motor. In deep wells the weight of this long shaft and its attached parts is very great, and many schemes have been proposed for supporting it or for counterbalancing it.

My invention relates to that mode of counterbalancing which utilizes the hydrostatic pressure of the rising column of water in the uptake or delivery-pipe of the pump. In order to cause this column to exert a lifting effect upon the shaft and its attached parts, I so construct the impeller that the water column is reversed in direction in passing through the impeller, so that at the point where the water leaves the impeller it is flowing downward, being subsequently reversed again in passing through the impeller-casing, so as to thereafter pursue an upward course into the uptake. The hydrostatic reaction on the impeller at the point of delivery therefrom is sufficient to lift and sustain all the rotating parts. In order to automatically regulate the lifting effect within predetermined limits, so as to maintain the shaft and impeller in substantially the same position while running, I provide above the impeller a chamber into which the water under pressure can leak past the periphery of the impeller. When the pressure in this chamber reaches a given value and the consequent differential pressure on the under side of the impeller has been lessened to the predetermined limit, the impeller and shaft will drop slightly, thereby opening an escape-port and relieving any excess of pressure in the chamber, so as to keep the differential balancing pressure at about the same point at all times irrespective of the fluctuations in the actual pressure of the water column. In another form of impeller the water column is not completely reversed, but is diverted from an upright longitudinal direction in the casing to a radially-lateral direction while passing through the impeller and is then turned upward again through the upper part of the casing. This impeller is provided with the same balancing-chamber and escape-ports automatically controlled by the rise and fall of the impeller as have been described in connection with the reversing-impeller.

It will be readily understood that other forms of impeller may be employed, but they must be such as to produce an upward hydrostatic pressure on the under side of the impeller, and this must be partially balanced by leakage-pressure in a chamber controlled by the longitudinal movement of the impeller due to the slight variations in the differential pressure.

Figure 21:
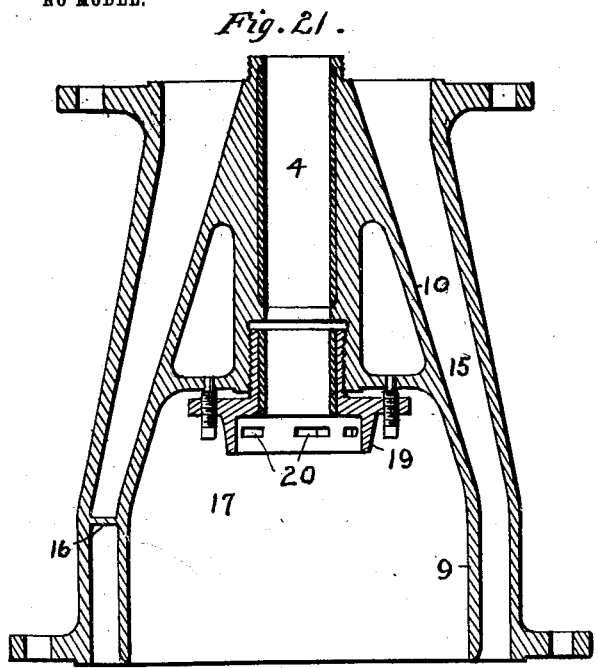
Figure 23:
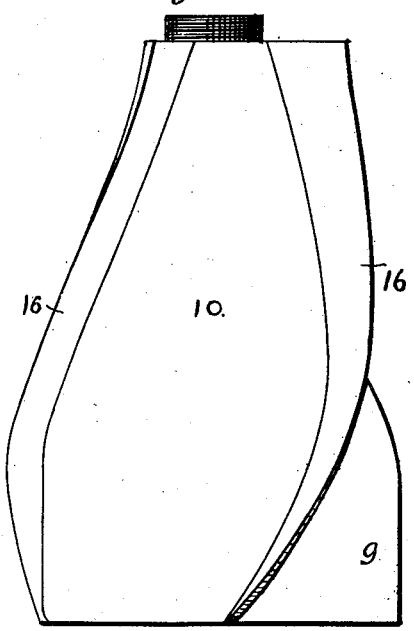
Figure 22:
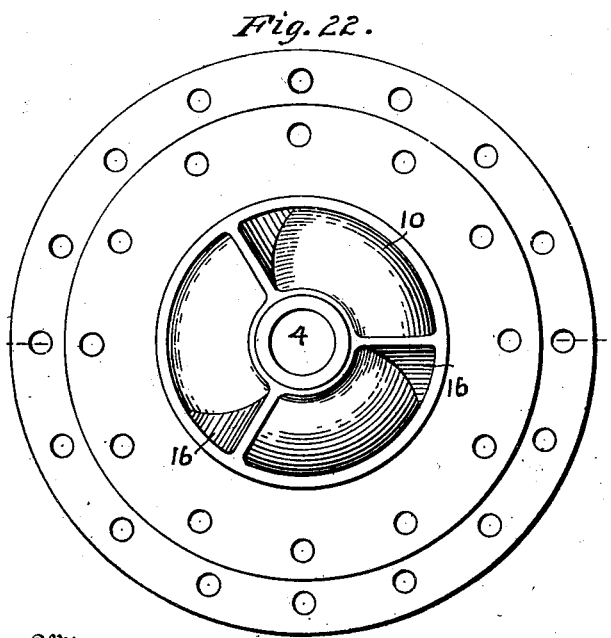
Figure 24:
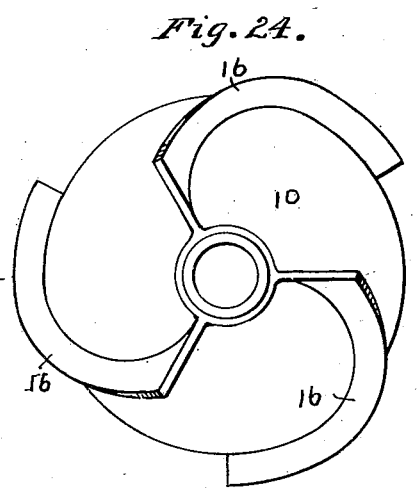
Figure 25:
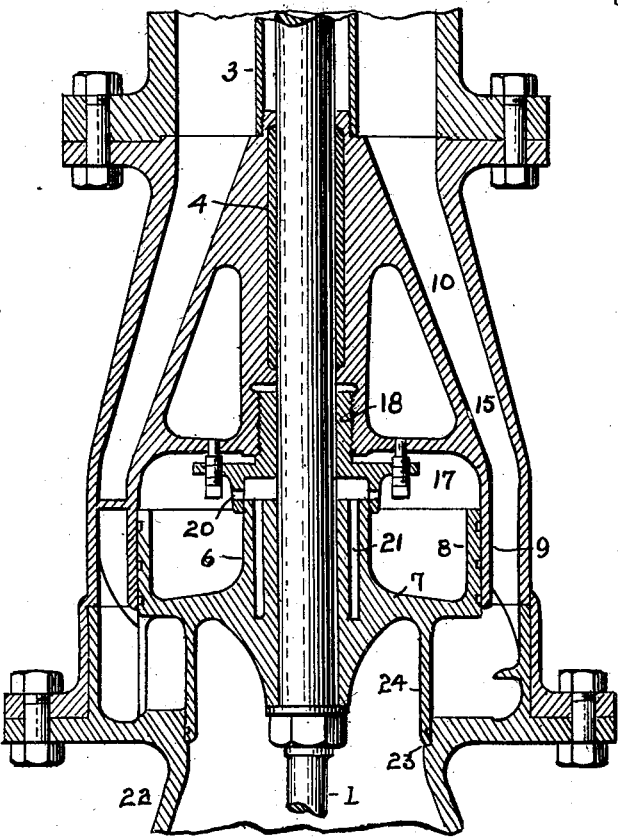
Figure 26:
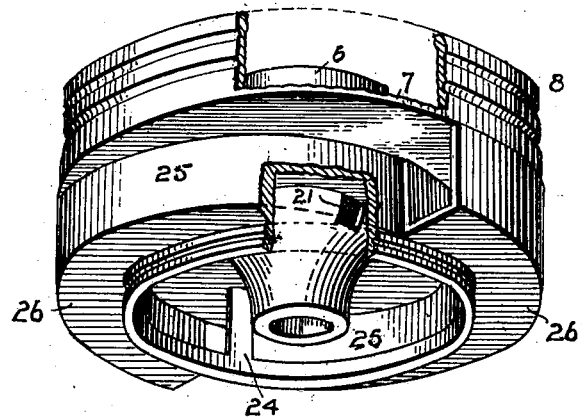

In the accompanying drawings, Figure 1 is a longitudinal section of the reversing-impeller and its casing. Fig. 2 is a bottom plan view of the impeller. Fig. 3 is a top plan view of the same. Figs. 4, 5, 6, and 7 are diametrical sections of the same on the correspondingly-numbered lines in Fig. 2. Fig. 8 is a side elevation of said impeller. Fig. 9 is a perspective view of a development of the web and flange-wall of the impeller. Fig. 10 is a top plan view of the lower section of the casing. Figs. 11, 12, 13, 14, 15, and 16 are radial sections of the same on the correspondingly-numbered lines in Fig. 10. Fig. 17 is a top plan view of the upper section of the casing. Fig. 18 is a side elevation of the gland for the stuffing-box on a larger scale. Fig. 19 is a diametrical section of the same. Fig. 20 is a bottom plan view of the same. Fig. 21 is a diametrical section of the upper section of the casing. Fig. 22 is a top plan view of the same. Fig. 23 is a side elevation of the inner shell of the same and the radial helical partitions. Fig. 24 is a top plan view of the same. Fig. 25 is a longitudinal section of the radial impeller and its casing. Fig. 26 is a perspective view of said impeller partly broken away.

The rotatable pump-shaft 1 passes down through the uptake or delivery-pipe 2, being preferably inclosed in a casing 3. The shaft has bearings 4 5 in the upper and lower sections of the casing, respectively. In the lower end of the upper section is located the impeller, which is a circular structure concentric with the shaft, to which it is firmly keyed or otherwise secured. The impeller has a hub 6, surrounded by a disk-shaped body 7, which is provided with a peripheral flange 8, containing packing-grooves and fitting snugly inside the cylindrical lower end 9 of the inner shell 10 of the upper section of the casing. Said cylindrical end 9 is long enough to allow the impeller to have a certain amount of longitudinal play.

Referring now especially to the figures of the drawings illustrating the reversing-impeller, it will be seen that between the hub and the periphery of the impeller is a cylindrical flange 11, extending preferably downward below the bottom of the flange 8 and having a rotating fit inside the upper end of the inner shell 12 of the lower section of the casing. The joint is preferably a rabbeted one, as shown, and the flange 11 has a water-packing groove in it. At certain points, preferably two, a web 13 connects the flange 11 with the hub, whose surface below the disk 7 is preferably tapering and concaved, as shown. The outer edge of the web 13 remains always in the same transverse plane, but its inner edge rises in a regular helical line along the surface of the hub, departing farther and farther from the center as it rises until it reaches a point longitudinally in line with the flange 11. That portion of said flange above the plane of junction with the web also veers outwardly, similarly to the web, so that a space of substantially uniform cross-section is maintained between them, the flange-wall moving downward as the web rises until at the point where the web assumes a position parallel with the axis of the hub the flange-wall becomes horizontal and terminates. The relative positions of the web and flange-wall are illustrated in Fig. 9, which is a perspective view of them as they would look straightened out instead of following the circular contour of the hub, as they actually do. In the drawings two webs are shown starting at diametrically opposite points and each continuing for three-eighths of the circumference of the hub. It will be seen from this construction that the water rising through the supply-passage in the inner shell 12 will be continuously lifted by the radial edges of the two webs and carried from a point inside the inner shell and flange 11 first upward, then outward, and finally downward to a point outside the flange 11 and between it and the peripheral flange 8. Here it enters an annular chamber in the lower section of the casing concentric with the supply-passage 12. The walls of this chamber 14 are twisted on helical lines in a fashion similar to the web and flange-wall of the impeller, so that the stream of water is carried first downward, then outward, and then upward through an outer concentric annular chamber 14'. By a careful study of Figs. 11 to 16, noting that they are successive radial sections of Fig. 10 through a quarter of its circumference, it is thought that the course and operation of the chamber-walls will be understood. From the outer chamber 14' the water passes up through the annular space 15 between the inner and outer shells of the upper section of the casing, whence it flows into the uptake. In order to counteract the rotary motion of the water as it issues from the chamber 14', the space 15 is divided into segments by helical radial partitions 16, uniting the two concentric shells of the upper casing-section and so inclined as to check the whirl of the water and send it into the uptake in substantially longitudinal lines.

It will be seen that at the point in the impeller where the water is reversed from an upward to a downward direction there will be an upward hydrostatic pressure due to the weight of the water column in the uptake. This pressure tends to lift the impeller and its shaft, and by properly proportioning the parts this lift can be made to counterbalance the rotating parts, so that the shaft will require no step-bearing, but will float, as it were, on the water. In order to regulate this counterbalancing effect so as to maintain the impeller automatically in substantially the same position irrespective of the fluctuations in the water-pressure, I provide above the disk of the impeller a chamber 17, formed inside the inner shell of the upper section of the casing. At its upper end the chamber is made water-tight by a stuffing-box surrounding the shaft 1. The gland 18 of the stuffing-box is flanged, forming a cup to receive the upper end of the hub 6 of the impeller, which has a snug fit in the flange 19. Through said flange are cut ports 20, and the longitudinal motion of the hub inside the flange will open and close these ports. One or more escape-ducts 21 are made through the impeller from the upper end of the hub to points below the disk 7 and opening into the supply-passage 12.

In the operation of the pump the pressure of the water column causes a certain leakage of water past the periphery of the impeller into the chamber 17. As this leakage accumulates in the chamber it counteracts the lifting effect of the pressure on the under side of the impeller, and if allowed to go on unregulated it would soon become so great as to balance that pressure and destroy the value of the water column as a balancing agent for the rotating parts. The ports 20 are therefore so located that when the back pressure in the chamber 17 reaches a predetermined point, at which the differential pressure on the disk of the impeller is just sufficient to properly balance the rotating parts, then the downward movement of the impeller has been sufficient to open the ports 20 and permit an escape of all subsequent leakage into the chamber to the suction side of the impeller. The device is thus self-regulating, and the impeller will maintain its normal position irrespective of the actual pressure of the water column in the uptake. This automatic regulating action is also secured by the impeller shown in Figs. 25 and 26, which operates by forcing the water outward in radial lines into the lower end of the upper section of the casing. Said upper section is similar to that used for the reversing-impeller; but the lower section is less intricate, being merely a pedestal 22, containing a lower bearing for the shaft 1 and having at its upper end a cylindrical shoulder 23, into which fits a cylindrical packed flange 24 on the impeller. The peripheral flange 8 on the impeller extends upward instead of downward, as in Fig. 1. Under the disk 7 are one or more eccentric webs 25, beginning at the flange 24 and ending at the periphery of the disk and joined to the flange by horizontal plates 26. When two such webs are used, as shown in the drawings, they each run half-way around the impeller. When this impeller is rotated, these webs, whose inner ends are in advance, continuously cut the water and force it radially outward into the upper section of the casing, where it passes up through the compartments between the helical partitions, and so on to the uptake. The hydrostatic pressure of the water column is exerted inwardly on the webs and upwardly on the disk and plates. The water leaking past the flange 8 is received in the chamber 17, and its escape is regulated by the ports 20 and the ducts 21 and hub 6, just as in the case of the reversing-impeller hereinbefore described.

In using these pumps in deep wells I place two or more of them at different depths, each delivering water into a common uptake, or I may arrange them tandem, all acting on the same water column, so that the lower pumps each deliver into the one next above.

Having thus described my invention, what I claim is—

1. In a rotary pump, the combination with an impeller having its under side exposed to the hydrostatic pressure of the water column in the uptake, of a casing having a chamber above said impeller and in which said impeller is free to move longitudinally, and means controlled by the impeller for regulating the pressure in said chamber.

2. In a rotary pump, the combination with an impeller having its under side exposed to the hydrostatic pressure of the water column in the uptake, of a casing containing a leakage-chamber above said impeller, and means controlled by the impeller for regulating the escape of leakage-water therefrom.

3. In a rotary pump, the combination with an impeller having its under side exposed to the hydrostatic pressure of the water column in the uptake, of a casing containing a leakage-chamber above said impeller, and means whereby the longitudinal movement of said impeller automatically regulates the escape of leakage-water from said chamber.

4. In a rotary pump, the combination with an impeller having its under side exposed to the hydrostatic pressure of the water column in the uptake, of a casing fitting the periphery of said impeller and forming a chamber above it, and escape ports and ducts leading from said chamber and controlled by the longitudinal movement of said impeller.

5. In a rotary pump, the combination with an impeller having its under side exposed to the hydrostatic pressure of the water column in the uptake, of a casing forming a chamber above said impeller, a cupped element in said chamber into which the hub of the impeller enters, ports in said cupped element controlled by said hub, and escape-ducts through said impeller.

6. In a rotary pump, the combination with an impeller having its under side exposed to the hydrostatic pressure of the water column in the uptake, of a casing forming a chamber above said impeller and in which said impeller is free to rise and fall, a stuffing-box for the shaft in said chamber, having a gland provided with a flange containing ports and fitting the upper end of the impeller-hub, and escape-ducts extending from the upper end of said hub to the suction side of the impeller.

7. In a rotary pump, the combination with an impeller having its under side exposed to the hydrostatic pressure of the water column in the uptake, of means for automatically confining the water which exerts a pressure on the upper side of the impeller, and means for automatically governing the escape of said water, so as to produce a differential pressure on the under side of the impeller substantially equal to the weight of the rotating parts.

8. In a rotary pump, the combination with an impeller having its under side exposed to the hydrostatic pressure of the water column in the uptake, of means for automatically confining the water which exerts a pressure on the upper side of the impeller, and means for automatically governing the escape of said water, so as to produce a differential pressure on the under side of said impeller substantially equal to the weight of the rotating parts, and means for maintaining said differential pressure constant.

9. A rotary pump having an impeller provided with a concentric flange one or more portions of which veer outwardly from a longitudinal to a radial position, and one or more webs extending between said flange and the hub of the impeller and running from a radial to a longitudinal position simultaneously with the change in the flange, and forming with the impeller a passage substantially constant in cross-section.

10. In a rotary pump, the combination with an impeller adapted to reverse the flow of the water, of a casing having concentric communicating passages arranged to reverse the flow of the water again.

11. In a rotary pump, the combination with an impeller delivering the water downwardly, of a casing having concentric passages adapted to receive and reverse the flow of water.

12. In a rotary pump, the combination with an axially-movable impeller adapted to deliver the water downwardly, of a casing having concentric passages arranged to reverse the flow of water, and means for automatically counterbalancing the upward reaction on the impeller.

13. In a rotary pump, the combination with an axially-movable impeller delivering the water downwardly, of a casing containing a leakage-chamber above said impeller, and means controlled by the impeller for regulating the escape of leakage-water from said chamber.

14. In a rotary pump, the combination with an axially-movable impeller delivering the water downwardly, of a casing containing a leakage-chamber above said impeller, and means whereby the axial movement of the impeller automatically regulates the escape of leakage-water from said chamber.

15. In a rotary pump, the combination with an axially-movable impeller delivering the water downwardly, of a casing fitting the periphery of said impeller and forming a chamber above it, and escape ports and ducts leading from said chamber and controlled by the axial movement of said impeller.

16. In a rotary pump, the combination with an impeller delivering the water downwardly, of a casing forming a chamber above said impeller, a cupped element in said chamber into which the hub of said impeller enters, ports in said cupped element controlled by said hub, and escape-ducts through said impeller.

In testimony whereof I affix my signature in presence of two witnesses.

JOHN WATSON ALVORD.

Witnesses:
R. L. OTWELL,
V. K. MORRIS.